United States Patent Office.

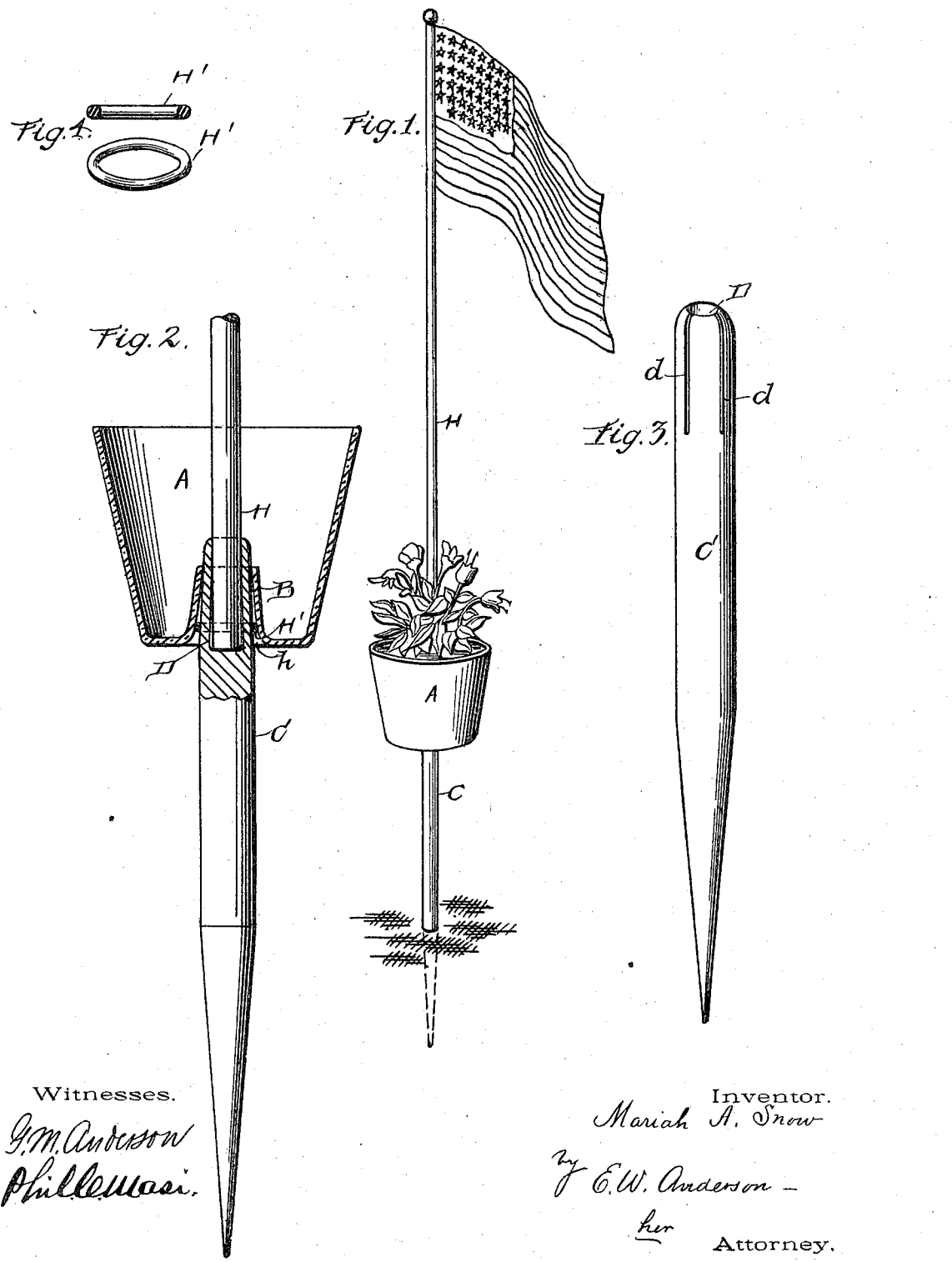

MARIAH A. SNOW, OF CHICAGO, ILLINOIS.

COMBINED VASE AND FLAG-HOLDER.

SPECIFICATION forming part of Letters Patent No. 585,486, dated June 29, 1897.

Application filed March 27, 1897. Serial No. 629,555. (No model.)

*To all whom it may concern:*

Be it known that I, MARIAH A. SNOW, a citizen of the United States, and a resident of Chicago, in the county of Cook and State of Illinois, have invented certain new and useful Improvements in a Combined Vase and Flag-Holder; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a perspective view of the invention as in application. Fig. 2 is a sectional view through invention. Fig. 3 is a perspective view of stick C. Fig. 4 illustrates packing-ring H in detail.

This invention is designed to provide a combined outdoor flower vase or pot and flag-holder of improved character; and it consists in the novel construction and combination of parts, all as hereinafter described, and pointed out in the appended claims.

Referring to the accompanying drawings, the letter A designates the receptacle which constitutes my flower vase or pot and flag-holder and which in the present instance and as preferred is in the form of an inverted frustum of a cone. Said receptacle is formed with a short central vertical tapering tube B, which extends through its bottom and is also open at its upper end.

C designates a stick which may be of any desired length and whose lower end portion is tapered and pointed, as indicated at $b$, to enable it to be readily forced into the ground. The upper end portion of this stick is adapted to be inserted into the tube B from the bottom and is formed with a socket D, whose walls are slitted or slotted at a number of points, as indicated at $d$. These slits or slots are for the purpose of causing the stick to fit more closely within the tapering tube B, the walls of the socket being thereby made capable of springing or yielding to a considerable extent. They also enable said socket to act as a clamp to hold therein a flagstaff or stick, and, furthermore, they permit expansion and contraction of the stick under different conditions of moisture. Inasmuch as in practice I prefer to make the receptacle A of glass, this provision for expansion and contraction becomes of considerable importance, since otherwise the stick by becoming wet from the water in the vase might swell to such an extent as to break the glass.

In use flowers are placed in the vase around the tube B, and the end portion of a flagstaff or stick H is inserted into the socket D, which projects above the upper end of the said tube. In this manner the flag is held securely against falling over and from being blown out by the wind.

In order to prevent the water in the vase from leaking out through the tube around the stick C, I provide a packing-ring of rubber or other suitable material. I prefer to make this ring of circular form in cross-section, as shown. The opening at the lower end of the tube B is formed with an inward bevel or flare, as indicated at $h$, and when the ring is placed upon the stick C and the latter is forced into said tube the ring rolls on the stick until it is forced to a position within the tube where it forms a tight joint. I may, however, use any other suitable arrangement of packing.

The device is especially adapted for the purpose of decorating soldiers' graves in accordance with the well-known custom in this country, but may also be used with good effect upon lawns or wherever outdoor decoration of this character is desired.

Having thus described my invention, what I claim as new, and desire to secure by Letters Patent, is—

1. The herein-described combined flower-vase and flag-holder, comprising a receptacle formed with a vertical tube therein, said tube being open at its ends, and a supporting-stick whose upper end portion is adapted to enter said tube from the bottom and has a socket formed therein, substantially as specified.

2. The herein-described combined flower-vase and flag-holder, comprising a receptacle formed with a vertical tube therein, said tube being open at its ends and tapered, and a supporting-stick whose upper end portion is adapted to enter said tube from the bottom and has a socket formed therein, the walls of said socket being slitted or slotted, substantially as and for the purpose described.

3. In a combined flower-vase and flag-holder, the receptacle having the internal vertical tube open at its ends and extending through the bottom of the receptacle, substantially as and for the purpose described.

4. The herein-described combined flower-vase and flag-holder, comprising a receptacle formed with an internal vertical tapered tube open at its ends and extending through the bottom of the receptacle, and a supporting-stick tapered and pointed at one end portion, and having its opposite end portion adapted to enter said tube from the bottom, and having therein a socket whose walls are slitted or slotted, substantially as and for the purpose described.

5. The herein-described combined flower-vase and flag-holder, comprising a receptacle having therein an open-ended vertical tube, a supporting-stick adapted to be inserted into the said tube from the bottom and formed with a socket in its upper end portion, and a packing around the said stick within the said tube, substantially as specified.

6. The herein-described combined flower-vase and flag-holder, comprising a receptacle having therein a tapered vertical tube, open at its ends, the opening at its inner end having an inward flare or bevel, the supporting-stick having the clamp-socket at its upper end, and the packing-ring of circular form in cross-section and seated around the said stick within said tube, substantially as specified.

In testimony whereof I affix my signature in presence of two witnesses.

MARIAH A. SNOW.

Witnesses:
 EDNA S. BUNBURY,
 C. S. PEARSON.